2,867,637

6α METHYL, 9αF,17α OH 1,4 PREGNADIENE COMPOUNDS

Frank H. Lincoln, Jr., Kalamazoo, William P. Schneider, Kalamazoo Township, Kalamazoo County, and George B. Spero, Kalamazoo, Mich., assignors to The Upjohn Company, Kalamazoo, Mich., a corporation of Michigan No Drawing. Application May 17, 1957
Serial No. 659,748

3 Claims. (Cl. 260—397.45)

The present invention relates to steroid compounds and is concerned with 6-hydrocarbyl substituted steroid compounds, particularly with 6-methyl-9α-fluoro-11β,17α-dihydroxy-1,4-pregnadiene-3,20-dione, the 21-iodo substituted intermediate, 6-methyl-9α-fluoro-17α-hydroxy-1,4-pregnadiene-3,11,20-trione, and a process for the production therefor.

This application is a continuation-in-part of applications S. N. 608,662, filed September 10, 1956, now abandoned, and S. N. 623,780, filed November 23, 1956.

The new compounds and the process of the present invention are illustratively represented by the following formulae:

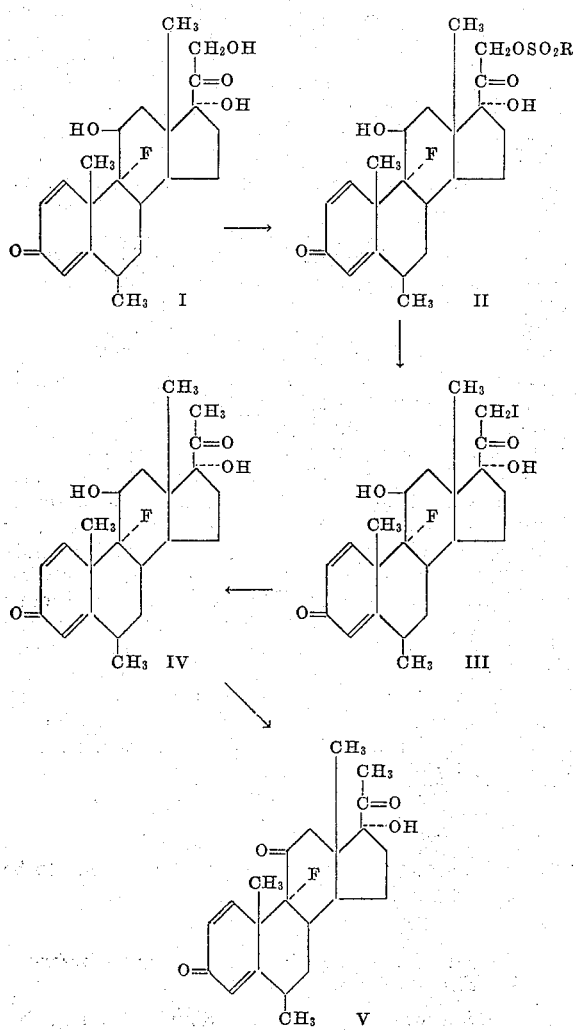

wherein R is an organic radical such as methyl, ethyl, propyl, tolyl, naphthyl, or the like, with methyl preferred.

The process of the present inventon comprises treating 6 - methyl - 9α - fluoro - 11β,17α,21 - trihydroxy - 1,4-pregnadiene-3,20-dione [1-dehydro-6-methyl-9α-fluorohydrocortisone (I)] with an organic sulfonyl halide such as methanesulfonyl chloride, toluenesulfonyl chloride, toluenesulfonyl bromide, benzenesulfonyl chloride, α- and β-naphthylsulfonyl chloride, or the like, to obtain the corresponding ester (II), a 21-alkyl- or 21-arylsulfonate of 6 - methyl - 9α - fluoro - 11β,17α,21 - trihydroxy - 1,4-pregnadiene-3,20-dione; treating the thus produced 21-alkyl- or arylsulfonate of 6-methyl-9α-fluoro-11β,17α,21-trihydroxy1,4-pregnadiene-3,20-dione with sodium iodide in acetone solution to obtain 6-methyl-9α-fluoro-11β,17α-dihydroxy-21-iodo-1,4-pregnadiene-3,20-dione (III); treating the thus obtained 6-methyl-9α-fluoro-11β,17α-dihydroxy-21-iodo-1,4-pregnadiene-3,20-dione with a reducing agent such as sodium thiosulfate, sodium bisulfite, potassium bisulfite, or the like, in an aqueous organic solvent mixture to obtain 6-methyl-9α-fluoro-11β,17α-dihydroxy-1,4-pregnadiene-3,20-dione (IV) and if desired oxidizing the thus obtained 6-methyl-9α-fluoro-11β,17α,dihydroxy-1,4-pregnadiene-3,20-dione with chromic anhydride, N-bromoacetamide, N-bromosuccinimide, or the like, to give 6-methyl-9α-fluoro-17α-hydroxy-1,4-pregnadiene-3,11,20-trione (V).

It is an object of the instant invention to provide 6-methyl - 9α - fluoro - 11β,17α - dihydroxy - 1,4-pregnadiene - 3,20 - dione and 6 - methyl - 9α - fluoro - 17α-hydroxy-1,4-pregnadiene-3,11,20-trione and, in particular, the 6α - epimers, 6α - methyl - 9α - fluoro - 11β,17α-dihydroxy - 1,4 - pregnadiene - 3,20 - dione and 6α-methyl - 9α - fluoro - 17α - hydroxy - 1,4 - pregnadiene-3,11,20-trione. It is another object of the instant invention to provide a process for the preparation of 6-methyl-9α - fluoro - 11β,17α - dihydroxy - 1,4 - pregnadiene - 3,20-dione and 6 - methyl - 9α - fluoro - 17α - hydroxy - 1,4-pregnadiene-3,11,20-trione and the 21-iodo analogues thereof, especially 6-methyl-9α-fluoro-11β,17α-dihydroxy-21-iodo-1,4-pregnadiene-3,20-dione. Other objects of this invention will be apparent to those skilled in the art to which this invention pertains.

The novel 6α-methyl-9α-fluoro-11β,17α-dihydroxy-1,4-pregnadiene-3,20-dione, the 6α-methyl-9α-fluoro-17α-hydroxy-1,4-pregnadiene-3,11,20-trione possess a high order of physiological activity, and possess activity spectra different from the adrenocortical hormones found in nature such as hydrocortisone and cortisone especially in their effect on mineral and water metabolism. These compounds cause a loss of salt and water, and this activity makes them especially valuable in the management of chronic congestive heart failure and in the treatment of cirrhosis of the liver, the nephrotic syndrome and the treatment of eclampsia and preeclampsia. The novel synthetic corticosteroid hormones of the present invention possess also anti-inflammatory, glucocorticoid, uterine, ovarial and adrenal growth-depressional, and adrenocorticoid activity. The anti-inflammatory activity is especially noticeable in all the steroids of the present invention. The 6β-epimers, 6β-methyl-9α-fluoro-11β,17α-dihydroxy-1,4-pregnadiene-3,20-dione and 6β-methyl-9α-fluoro-17α-hydroxy-1,4-pregnadiene-3,11,20-trione possess the same type of activity as the 6α-epimers.

The novel 6-methyl-9α-fluoro-11β,17α-dihydroxy-1,4-pregnadiene-3,20-dione and 6-methyl-9α-fluoro-17α-hydroxy-1,4-pregnadiene-3,11,20-trione are useful in oral, parenteral and topical compositions. In oral compositions the material may be given as tablets illustratively using either polyethylene glycol 4000 or 6000 as a carrier or lactose and/or sucrose as a diluent. The novel 6α-methyl-9α - fluoro - 11β,17α - dihydroxy - 1,4 - pregnadiene - 3,20-dione and 6α-methyl-9α-fluoro-17α-hydroxy-1,4-pregnadiene-3,11,20-trione are useful for topical application as ointments, lotions, jellies, creams, suppositories, bougies, aqueous suspensions etc. Examples of advantageous topical compositions are given below. While the examples below are to the 6α-methyl-9α-fluoro-11β,17α-dihydroxy-1,4-pregnadiene-3,20-dione and 6α-methyl-9α-fluoro-17α-hydroxy - 1,4 - pregnadiene - 3,11,20 - trione, equivalent amounts of 6β-methyl-9α-fluoro-11β,17α-dihydroxy-1,4-pregnadiene-3,20-dione and 6β-methyl-9α-fluoro-17α-hydroxy-1,4-pregnadiene-3,11,20-trione and of other 6-lower-alkyl and phenyl homologues of the compounds of this invention are substitutable therein.

A dermatological and ophthalmic ointment has the following composition:

|  | Lbs. |
|---|---|
| Wool fat, U. S. P | 100 |
| Mineral oil U. S. P | 125 |
| 6α - methyl - 9α - fluoro - 11β,17α - dihydroxy-1,4 - pregnadiene - 3,20 - dione (micronized) | 0.5 |
| White petrolatum, U. S. P | 500 |

Incorporation of an antibiotic in the ointment, especially neomycin sulfate, has therapeutic advantages; each active ingredient potentiating and supplementing the useful properties of the other. Such an ointment is as follows:

|  | Lbs. |
|---|---|
| Wool fat, U. S. P | 100 |
| Mineral oil, U. S. P | 125 |
| Neomycin sulfate | 3 |
| 6α - methyl - 9α - fluoro - 11β,17α - dihydroxy-1,4 - pregnadiene - 3,20 - dione (micronized) | 0.3 |
| White petrolatum, U. S. P | 500 |

In place of, or in addition to neomycin sulfate, other antibiotics such as bacitracin, circulin, polymyxin B sulfate, gramicidin, streptomycin sulfate, dihydrostreptomycin sulfate, oxytetracycline, chlorotetracycline, tetracycline, chloramphenicol and the sulfonamides can be used in conjunction with the steroids of the present invention for preparations such as the above ointments.

The 6 - methyl - 9α - fluoro - 11β,17α - dihydroxy - 21-iodo-1,4-pregnadiene-3,20-dione is important as an intermediate for the production of 6-methyl-9α-fluoro-11β,17α-dihydroxy - 1,4 - pregnadiene - 3,20 - dione as shown in Example 3.

In carrying out the process of the instant invention, 1 - dehydro- 9α - fluoro - 6 - methylhydrocortisone (6α-methyl - 9α - fluoro - 11β,17α,21 - trihydroxy - 1,4 - pregnadiene - 3,20 - dione or 6β - methyl - 9α - fluoro-11β,17α,21 - trihydroxy - 1,4 - pregnadiene - 3,20 - dione) is treated with an acid halide of a sulfonic acid such as methanesulfonic acid, ethanesulfonic acid, propanesulfonic acid, benzenesulfonic acid, para-toluenesulfonic acid, α- or β-naphthanesulfonic acid, or the like, with methanesulfonic acid halides especially methanesulfonyl chloride preferred. In the preferred embodiment of the instant invention the steroid is reacted with the alkyl- or arylsulfonyl halide, in solution in a solvent, such as for example, pyridine, benzene, toluene, or the like, at a temperature between minus ten and plus thirty degrees centigrade, providing that at the lower temperature the reaction mixture has not solidified. Pyridine as solvent and a temperature between minus ten and plus ten degrees centigrade is preferred. The time of reaction is usually between thirty minutes and twenty four hours, after which the product, 6-methyl-9α-fluoro-11β,17α,21-trihydroxy-1,4-pregnadiene-3,20-dione 21-alkyl- or arylsulfonate is removed in conventional manner, for example, by evaporating the solvent until a dry residue is obtained or by extracting the material from an aqueous solution. For extraction, solvents such as methylene chloride, chloroform, carbon tetrachloride, benzene, ether, toluene, or the like may be used. Removing the extraction solvent by distillation leaves the crude 6-methyl-9α-fluoro-11β,17α,21 - trihydroxy - 1,4 - pregnadiene - 3,20 - dione 21-alkyl- or arylsulfonate.

For the purpose of producing the final product, it is unnecessary to purify the thus obtained 21-aryl- or 21-alkylsulfonate, and the crude steroid sulfonate ester is used for the production of 6-methyl-9α-fluoro-11β,17α-dihydroxy - 21 - iodo - 1,4 - pregnadiene - 3,20 - dione.

The 21-iodo compound is prepared by reacting the alkyl- or arylsulfonate of 6-methyl-9α-fluoro-11β,17α,21-trihydroxy-1,4-pregnadiene-3,20-dione with sodium or potassium iodide in acetone solution. A molar excess of sodium iodide (three to twenty moles of sodium iodide per mole of steroid) is generally preferred for this reaction and the reaction mixture containing 6-methyl-9α-fluoro-11β,17α,-21 - trihydroxy - 1,4 - pregnadiene - 3,20 - dione 21-alkyl- or arylsulfonate and sodium iodide in acetone is heated to reflux for a period of three or four minutes to half an hour. The thus produced 6-methyl-9α-fluoro-11β,17α - dihydroxy - 21 - iodo - 1,4 - pregnadiene-3,20-dione is isolated by evaporating the solvent. For the subsequent reaction it is unnecessary to purify the thus obtained 6 - methyl - 9α - fluoro - 11β,17α - dihydroxy-21-iodo-1,4-pregnadiene-3,20-dione.

In order to obtain 6-methyl-9α-fluoro-11β,17α-dihydroxy - 1,4 - pregnadiene - 3,20 - dione, the crude 6-methyl - 9α - fluoro - 11β,17α - dihydroxy - 21 - iodo-1,4-pregnadiene-3,20-dione is reacted with a reducing agent such as sodium or potassium thiosulfate, sodium bisulfite, or the like. In the preferred embodiment of the invention, the crude 6-methyl-9α-fluoro-11β,17α-dihydroxy-21-iodo-1,4-pregnadiene-3,20-dione is slurried in acetic acid, and thereto is added the aqueous solution of sodium or potassium thiosulfate, bisulfate, or the like, and the mixture stirred at room temperature for a period of ten minutes to two hours. The product is isolated from the aqueous reaction mixture by conventional methods such as filtration or extraction with a water-immiscible organic solvent, such as ether, benzene, methylene chloride, ethylene chloride, carbon tetrachloride, chloroform, hexane, heptane, or the like, and evaporating the extracts. Purification of the thus obtained 6-methyl-9α-fluoro-11β,17α-dihydroxy-1,4-pregnadiene-3,20-dione is carried out by conventional means such as recrystallization from ether, acetone, methanol, ethanol, Skellysolve B hexane, mixtures thereof, or the like; or by chromatography.

The oxidation of 6-methyl-9α-fluoro-11β-17α-dihydroxy-1,4-pregnadiene-3,20-dione is generally carried out in conventional manner such as, for example, oxidizing the 6 - methyl - 9α - fluoro - 11β,17α - dihydroxy - 1,4-pregnadiene-3,20-dione in acetic acid solution with chromic anhydride using a calculated amount of chromic anhydride or a slight excess such as from ten to thirty percent excess above the calculated amount; or oxidizing the 6 - methyl - 9α - fluoro - 11β,17α - dihydroxy - 1,4-pregnadiene-3,20-dione with a N-haloacidamide or N-haloacidimide, such as N-bromoacetamide, N-chlorosuccinimide, N-bromosuccinimide in pyridine, dioxane, or other solvent solutions. After termination of the oxidation, the oxidant is generally destroyed such as by addition of methyl alcohol or ethyl alcohol, when chromic acid was used, or an alkali bisulfite when either chromic acid or N-bromosuccinimide and other N-haloacylamides were used. Thereafter, the product 6-methyl-9α-fluoro-17α-hydroxy-1,4-pregnadiene-3,11,20-trione is obtained by conventional means such as extraction with water-immiscible solvents, for example, methylene chloride, ethylene chloride, chloroform, carbon tetrachloride, ether, benzene, toluene, or the like, or by chromatography, if deemed necessary.

The following examples are illustrative of the process and products of the present invention, but are not to be construed as limiting.

EXAMPLE 1

*6α-methyl-9α-fluoro-11β,17α,21-trihydroxy-1,4-pregnadiene-3,20-dione 21-methanesulfonate*

A solution was prepared containing 250 milligrams of 1-dehydro-6α-methyl-9α-fluorohydrocortisone [George B. Spero et al., J. Am. Chem. Soc. 79, 1515 (1957)] in six milliliters of pyridine. This solution was cooled to zero degrees centigrade and treated with 0.25 milliliter of methanesulfonyl chloride. Thereafter the solution was allowed to stir at a temperature between zero and five degrees centigrade for a period of eighteen hours. Thereafter ice and two milliliters of water were added, followed by thirty milliliters of sufficient dilute (five percent) hydrochloric acid to neutralize the pyridine. The mixture was then filtered, the precipitate washed with water, and dried to give 197 milligrams of crude 6α-methyl-9α-fluoro-11β,17α,21-trihydroxy-1,4-pregnadiene-3,20-dione 21-methanesulfonate of melting point 165 to 185 degrees centigrade.

EXAMPLE 2

*6α-methyl-9α-fluoro-11β,17α-dihydroxy-21-iodo-1,4-pregnadiene-3,20-dione*

The crude 197 milligrams of methanesulfonate of 6α-methyl-9α-fluoro - 11β,17α,21 - trihydroxy - 1,4 - pregnadiene-3,20-dione of Example 1 was dissolved in five milliliters of acetone and treated with a solution of 197 milligrams of sodium iodide in five milliliters of acetone. The mixture was heated under reflux with stirring for a period of fifteen minutes. The heating was then discontinued and the mixture concentrated to dryness at reduced pressure to give 6α-methyl-9α-fluoro-11β,17α-dihydroxy-21-iodo-1,4-pregnadiene-3,20-dione.

EXAMPLE 3

*6α-methyl-9α-fluoro-11β,17α-dihydroxy-1,4-pregnadiene-3,20-dione*

The crude 6α-methyl-9α-fluoro-11β,17α-dihydroxy-21-iodo-1,4-pregnadiene-3,20-dione was slurried with five milliliters of acetic acid and stirred for a period of 45 minutes. Thereafter was added a solution of 250 milligrams of sodium thiosulfate pentahydrate in five milliliters of water causing the iodine color to disappear. Additional water was added (thirty milliliters) and the reaction mixture was filtered. The resulting solid precipitate was washed with water and dried to give 146 milligrams of crude 6α-methyl-9α-fluoro-11β,17α-dihydroxy-1,4-pregnadiene-3,20-dione.

The crude material was then chromatographed by dissolving 120 milligrams of 6α-methyl-9α-fluoro-11β,17α-dihydroxy-1,4-pregnadiene-3,20-dione in 300 milliliters of methylene chloride and allowing the thus obtained solution to be absorbed by a chromatographic column containing ten grams of Florisil anhydrous magnesium silicate. The column was developed taking fractions of twenty milliliters each as follows:

TABLE I

| Fraction | Solvent |
| --- | --- |
| 1-5 | Skellysolve B-hexane-5% acetone. |
| 6-10 | Skellysolve B-hexane-10% acetone. |
| 11-15 | Skellysolve B-hexane-15% acetone. |
| 16-20 | Skellysolve B-hexane-20% acetone. |
| 21-25 | Skellysolve B-hexane-30% acetone. |
| 26-28 | Acetone. |

Fractions 11 through 24 inclusive were combined, evaporated and twice recrystallized from acetone to give pure 6α-methyl-9α-fluoro-11β,17α-dihydroxy-1,4 - pregnadiene-3,20-dione of melting point 292 to 303 degrees centigrade.

EXAMPLE 4

*6α-methyl-9α-fluoro-17α-hydroxy-1,4-pregnadiene-3,11,20-trione*

A mixture was prepared containing 0.3 gram of 6α - methyl - 9α-fluoro - 11β,17α - dihydroxy - 1,4 - pregnadiene-3,20-dione, 100 milligrams of chromic anhydride, ten milliliters of glacial acetic acid and one-half milliliter of water. This mixture was stirred and thereupon maintained for eight hours at room temperature. Thereafter the mixture was poured into fifty milliliters of ice water, neutralized by the addition of dilute sodium hydroxide and the thus obtained precipitate collected on a filter and recrystallized three times from ethyl acetate and Skellysolve B hexanes to give 6α-methyl-9α-fluoro-17α-hydroxy-1,4-pregnadiene-3,11,20-trione.

EXAMPLE 5

In the same manner shown in Example 1, treating other 1-dehydro-6α-alkyl-9α-fluorohydrocortisones and 1-dehydro-6α-alkyl-9α-fluorocortisones with the chlorides or bromides of toluenesulfonic acid, methanesulfonic acid and other organic sulfonic acids, give the corresponding 21-toluene-sulfonate, the 21-methanesulfonate, or the like, of the corresponding 1-dehydro-6α-alkylhydrocortisone and 1-dehydro-6α-alkyl-9α-fluorocortisone wherein the alkyl group is methyl, ethyl, propyl, isopropyl, butyl, isobutyl, pentyl, hexyl, phenyl, or the like.

Treating the thus obtained 21-toluenesulfonate, 21-methanesulfonate or other 21-alkyl- or 21-arylsulfonates of 1-dehydro-6α-alkyl-9α-fluorohydrocortisone and 1-dehydro-6α-alkyl-9α-fluorocortisone or the 1-dehydro-6α-aryl analogues thereof with sodium or potassium iodide in acetone at elevated temperature, usually at reflux temperature, yields the corresponding 21-iodo compound such as, for example, 6α-ethyl-9α-fluoro-11β,17α-dihydroxy-21-iodo-1,4-pregnadiene-3,20-dione, 6α-propyl-9α-fluoro-11β,17α-dihydroxy-21-iodo-1,4-pregnadiene - 3,20 - dione, 6α-isopropyl-9α-fluoro-11β,17α-dihydroxy - 21 - iodo-1,4-pregnadiene-3,20-dione, 6α-butyl-9α-fluoro-11β,17α-dihydroxy-21-iodo-1,4-pregnadiene - 3,20 - dione, 6α-isobutyl-9α-fluoro-11β,17α-dihydroxy-21-iodo - 1,4 - pregnadiene-3,20-dione, 6α-pentyl-9α-fluoro - 11β,17α - dihydroxy - 21-iodo-1,4-pregnadiene-3,20-dione, 6α - phenyl - 9α - fluoro-11β,17α-dihydroxy-21-iodo-1,4-pregnadiene - 3,20 - dione, 6α-methyl-9α-fluoro-17α-hydroxy-21 - iodo - 1,4 - pregnadiene-3,11,20-trione, 6α-ethyl-9α-fluoro-17α-hydroxy - 21-iodo-1,4-pregnadiene-3,11,20-trione, 6α-propyl-9α-fluoro-17α-hydroxy-21-iodo - 1,4 - pregnadiene - 3,11,20 - trione, 6α-isopropyl-9α-fluoro-17α-hydroxy-21-iodo-1,4 - pregnadiene-3,11,20-trione, 6α-butyl-9α-fluoro-17α-hydroxy-21-iodo-1,4-pregnadiene - 3,11,20 - trione, 6α - isobutyl - 9α-fluoro-17α-hydroxy-21 - iodo - 1,4 - pregnadiene - 3,11,20-trione, 6α-pentyl-9α-fluoro-17α - hydroxy - 21 - iodo - 1,4-pregnadiene-3,11,20-trione, 6α - hexyl - 9α - fluoro - 17α-hydroxy-21-iodo - 1,4 - pregnadiene - 3,11,20 - trione, 6α-phenyl-9α-fluoro-17α-hydroxy-21-iodo - 1,4 - pregnadiene-3,11,20-trione, and the like.

Treating the thus obtained 6α-alkyl-9α-fluoro-11β,17α-dihydroxy-21-iodo-1,4-pregnadiene-3,20-diones and 6α-alkyl-9α-fluoro-17α-hydroxy-21 - iodo - 1,4 - pregnadiene-3,11,20-triones with a reducing agent, such as zinc in acetic acid, sodium bisulfite, sodium or potassium thiosulfate produces the corresponding 6α-alkyl-9α-fluoro-11β,17α-dihydroxy-1,4-pregnadiene - 3,20 - diones and 6α-alkyl-9α-fluoro-17α-hydroxy - 1,4 - pregnadiene - 3,11,20-triones wherein the alkyl group is ethyl, propyl, isopropyl, butyl, isobutyl, pentyl, hexyl, or aryl such as phenyl, or the like.

Instead of the 1-dehydro-6α-methylhydrocortisone or cortisone, the 6β-epimer can be used in the above examples and if the reaction conditions are kept near neutral, the 6β-epimers, such as 6β-methyl-9α-fluoro-11β,17α-dihydroxy-1,4-pregnadiene-3,20-dione and 6β-methyl-9α-fluoro-17α-hydroxy-1,4-pregnadiene-3,11,20-trione can be isolated from the reaction mixture. The thus obtained 6β-epimers yield the 6α-epimers by treatment of the 6β-epimer with acid or base in an organic solvent, e. g., ethanol at room temperature.

EXAMPLE 6

*6α-methyl-9α-fluoro-11β,17α-dihydroxy-1,4-pregnadiene-3,20-dione*

A mixture of one gram of 6α-methyl-11β,17α-dihydroxy-1,4-pregnadiene-3,20-dione, 650 milligrams of N-bromo-acetamide and six milliliters of pyridine were stirred in the dark for a period of thirty minutes. The mixture was cooled in an ice-water bath and a stream of sulfur dioxide was directed onto the surface of the stirred mixture until a negative potassium iodide-starch test was obtained. Fifty milliliters of water was then added to the mixture and the mixture was maintained at about five degrees centigrade for thirty minutes. The precipitated white solid was filtered, washed with water, and dried under vacuum. After crystallization from acetone there was obtained about 0.75 gram of 6α-methyl-17α-hydroxy-1,4,9(11)- pregnatriene-3,20-dione.

0.5 gram of 6α-methyl-17α-hydroxy-1,4,9(11)-pregnatriene-3,20-dione was dissolved in twenty milliliters of methylene chloride and thereto was added a solution of one milliliter of 71 percent perchloric acid in ten milliliters of water and 200 milligrams of N-bromoacetamide in fifty milliliters of tertiary butyl alcohol. The solution was maintained at room temperature for fifteen minutes and then mixed with a solution of 0.3 gram of sodium sulfite in twelve milliliters of water. The mixture was distilled at reduced pressure until the residual solution became cloudy. The product was then precipitated by the addition of 100 milliliters of a mixture of ice-water. The white crystalline precipitate was filtered, washed with water and then dried and recrystallized from a mixture of acetone and Skellysolve B hexane hydrocarbons to give 6α-methyl-9α-bromo-11β,17α,dihydroxy-1,4-pregnadiene-3,20-dione.

A mixture of 0.45 gram of 6α-methyl-9α-bromo-11β,17α-dihydroxy-1,4-pregnadiene-3,20-dione, 0.45 gram of anhydrous potassium acetate and twenty milliliters of acetone was heated at its refluxing temperature for a period of five hours. The mixture was then cooled and poured into water and extracted with methylene chloride. The methylene chloride extract was dried and poured over a column of 25 grams of Florisil synthetic magnesium silicate. The column was developed with Skellysolve B hexane hydrocarbons containing increasing portions of acetone. The Skellysolve B plus ten percent acetone eluate contained 6α-methyl-9(11)-oxido-17α-hydroxy-1,4-pregnadiene-3,20-dione.

A solution of one gram of 6α-methyl-9(11)-oxido-17α-hydroxy-1,4-pregnadiene-3,20-dione was dissolved in fifty milliliters of methylene chloride and thereto was added five milliliters of 48 percent hydrofluoric acid and 0.5 milliliter of 71 percent perchloric acid. The mixture was stirred vigorousy for six hours and then poured into an excess of cold aqueous five percent sodium bicarbonate solution. The methylene chloride layer was separated, dried with anhydrous sodium sulfate and then poured over a column of 100 grams of Florisil synthetic magnesium silicate. The column was developed with Skellysolve B hexanes and acetone, the fractions containing ten percent acetone were recrystallized from acetone and Skellysolve B hexanes to give pure 6α-methyl-9α-fluoro-11β,17α-dihydroxy-1,4-pregnadiene-3,20-dione of melting point 292 to 303 degrees centigrade.

Following the procedure described in Example 6, but substituting other 6α-alkyl- or 6α-aryl-11β,17α-dihydroxy-1,4-pregnadiene-3,20-diones for the 6α-methyl-11β,17α-dihydroxy-1,4-pregnadiene-3,20-dione wherein the alkyl radical is ethyl, propyl, isopropyl, butyl, isobutyl, pentyl, hexyl, or an aryl, such as phenyl, or the like, results in the corresponding 6α-alkyl-9α-fluoro-11β,17α-dihydroxy-1,4-pregnadiene-3,20-dione wherein the alkyl group will be ethyl, propyl, isopropyl, butyl, isobutyl, pentyl, hexyl; or an aryl such as phenyl, or the like.

In the same manner given in Example 4, oxidizing with chromic anhydride in acetic acid solution, other 6α-alkyl- or 6α-aryl-9α-fluoro-11β,17α-dihydroxy-1,4-pregnadiene-3,20-dione results in the corresponding 6α-alkyl-9α-fluoro-17α-hydroxy-1,4-pregnadiene-3,11,20-triones wherein the alkyl group is ethyl, propyl, isopropyl, butyl, isobutyl, pentyl, hexyl, or aryl such as phenyl, or the like.

In the same manner as shown with the 6α-epimers the 6β-epimers may be used as starting materials for the above Example 6.

EXAMPLE 7

*6α - methyl - 9α - fluoro -11β,17α - dihydroxy-1,4-pregnadiene-3,20-dione from 6α-methyl-9α-fluoro-11β,17α-dihydroxy-4-pregnene-3,20-dione*

Six 100-milliliter portions of a medium in 250-milliliter Erlenmeyer flasks containing one percent glucose, two percent corn steep liquor (60 percent solids) and tap water was adjusted to a pH of 5.9. This medium was sterilized for 45 minutes at fifteen pounds per square inch pressure and inoculated with a one to two day growth of *Septomyxa affinis* ATCC 6737. The Erlenmeyer flasks were shaken at room temperature at about 25 degrees centigrade for a period of three days. At the end of this period, this 600-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 R. P. M.) and aerated (0.5 l. air/10 l. beer). After 17 hours of incubation, when a good growth developed and the acidity rose to pH 6.7, two grams of 6α-methyl-9α-fluoro-11β,17α-dihydroxy-4-pregnene-3,20-dione (copending application Serial No. 659,754, filed May 17, 1957) plus one gram of 3-ketobisnor-4-cholen-22-al dissolved in 115 milliliters of dimethylformamide, was added and the incubation (conversion) carried out at the same temperature and aeration for 24 hours as used during the incubation. The mycelium was filtered off and the steroidal material was extracted with methylene chloride, the methylene chloride extracts evaporated to dryness, and the resulting residue chromatographed over a Florisil anhydrous magnesium silicate column. The column was packed with 200 grams of Florisil and was developed with five 400-milliliter fractions each of methylene chloride, Skellysolve B hexane-acetone mixtures of 9:1, 8:2, 7:3, 1:1, and methanol. The fraction eluted with Skellysolve B hexane-acetone (7:3) was evaporated and recrystallized from acetone to give 6α-methyl-9α-fluoro-11β,17α-dihydroxy-1,4-pregnadiene-3,20-dione of melting point 292 to 303 degrees centigrade.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:

1. A compound selected from the group consisting of 6-methyl-9α-fluoro-11β,17α-dihydroxy-1,4 - pregnadiene-3,20-dione and 6-methyl-9α-fluoro-17α-hydroxy-1,4-pregnadiene-3,11,20-trione.

2. 6α-methyl-9α-fluoro-11β,17α-dihydroxy-1,4 - pregnadiene-3,20-dione.

3. 6α-methyl-9α-fluoro-17α-hydroxy - 1,4 - pregnadiene-3,11,20-trione.

References Cited in the file of this patent

UNITED STATES PATENTS

| | | |
|---|---|---|
| 2,763,671 | Fried | Sept. 18, 1956 |
| 2,814,632 | Nussbaum | Nov. 26, 1957 |

OTHER REFERENCES

Spero et al.: JACS, 78, December 5, 1956, pages 6213, 6214.